(12) United States Patent
Morrow et al.

(10) Patent No.: US 7,328,249 B2
(45) Date of Patent: *Feb. 5, 2008

(54) AUTOMATIC STATUS NOTIFICATION

(75) Inventors: Darin J. Morrow, Acworth, GA (US); John A. Strohmeyer, Norcross, GA (US); Mark Kirkpatrick, Conyers, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/209,876

(22) Filed: Aug. 23, 2005

(65) Prior Publication Data

US 2005/0281396 A1    Dec. 22, 2005

Related U.S. Application Data

(63) Continuation of application No. 09/468,447, filed on Dec. 21, 1999, now Pat. No. 6,968,360.

(51) Int. Cl.
*G06F 15/16*    (2006.01)

(52) U.S. Cl. .................... 709/206; 709/204

(58) Field of Classification Search ........ 709/201–203, 709/204–207, 217–219; 705/26–27
See application file for complete search history.

(56) References Cited

U.S. PATENT DOCUMENTS

| | | | |
|---|---|---|---|
| 5,548,506 A | | 8/1996 | Srinivasan |
| 5,933,604 A | * | 8/1999 | Inakoshi .................... 709/226 |
| 6,151,643 A | | 11/2000 | Cheng et al. |
| 6,275,809 B1 | | 8/2001 | Tamaki et al. |
| 6,314,425 B1 | | 11/2001 | Serbinis et al. |
| 6,442,241 B1 | | 8/2002 | Tsumpes |
| 6,519,763 B1 | | 2/2003 | Kaufer et al. |
| 6,522,421 B2 | | 2/2003 | Chapman et al. |
| 6,581,040 B1 | | 6/2003 | Wright et al. |
| 2002/0156708 A1 | | 10/2002 | Ronen et al. |
| 2003/0088473 A1 | | 5/2003 | Fisher et al. |
| 2003/0103605 A1 | | 6/2003 | Knox |

* cited by examiner

*Primary Examiner*—Glenton B. Burgess
*Assistant Examiner*—Yasin M Barqadle
(74) *Attorney, Agent, or Firm*—David W. Lynch; Merchant & Gould

(57) ABSTRACT

A status reporting system (SRS) automatically reports updated status of a project to an interested party based on status information stored in a status system. The SRS is communicatively coupled to the status system and includes a monitoring device that contacts the status system to determine whether such status system has new status information stored therein and obtains such new status information from the status system. An internal mail device receives the obtained status information, ascertains from the received status information the interested party, locates an electronic mail address for the interested party, formats the received status information into a piece of electronic mail which includes the received status information and the located electronic mail address, and forwards the piece of electronic mail to the interested party by way of an electronic mail service.

15 Claims, 2 Drawing Sheets ns shown. In the drawings:

AUTOMATIC STATUS NOTIFICATION

This application is a continuation application of U.S. patent application Ser. No. 09/468,447, filed Dec. 21, 1999, now U.S. Pat. No. 6,968,360 the disclosure of which is incorporated hereto.

FIELD OF THE INVENTION

The present invention relates to a method and system for providing automatic notification of the status of a project. In particular, the present invention relates to providing automatic status notification by way of an electronic mail system.

BACKGROUND OF THE INVENTION

In a relatively complex project, it is commonplace to maintain status information for the project. For example, a manufacturer of a relatively complex electronic product commonly wishes to keep track of the status of each phase of the manufacturing of the product, the status of the manufacturing of each system component, etc. Typically, to maintain such status information, a computer system and database are employed as a status system, and such status system receives and stores a plurality of pre-determined goals and sub-goals (i.e., project milestones), as well as information regarding when each project milestone is reached. One such status system is Work and Force Administration system, designed and/or marketed by Telcordia Technologies (formerly Bellcore) of Morristown, N.J.

With such a status system, status information regarding the status of a product in production is available to the manufacturer thereof almost instantaneously. Notably, the customer for whom the product is being manufactured would likely appreciate if not demand that such status information be available to it, too, almost instantaneously. However, and as is to be readily appreciated, providing such customer with access to the manufacturer's status system raises serious security issues, among other things. As a result, such access is not usually provided, even though this may in turn require that the manufacturer constantly update the customer on the status of the product under manufacture.

Accordingly, a need exists for a method and a system to automatically notify the customer of updates in the status of the product under manufacture without providing the customer with direct access to the manufacturer's status system.

SUMMARY OF THE INVENTION

In the present invention, a status reporting system (SRS) automatically reports updated status of a project to an interested party based on status information stored in a status system. The SRS is communicatively coupled to the status system and includes a monitoring device that contacts the status system to determine whether such status system has new status information stored therein and obtains such new status information from the status system. An internal mail device receives the obtained status information, ascertains from the received status information the interested party, locates an electronic mail address for the interested party, formats the received status information into a piece of electronic mail which includes the received status information and the located electronic mail address, and forwards the piece of electronic mail to the interested party by way of an electronic mail service.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
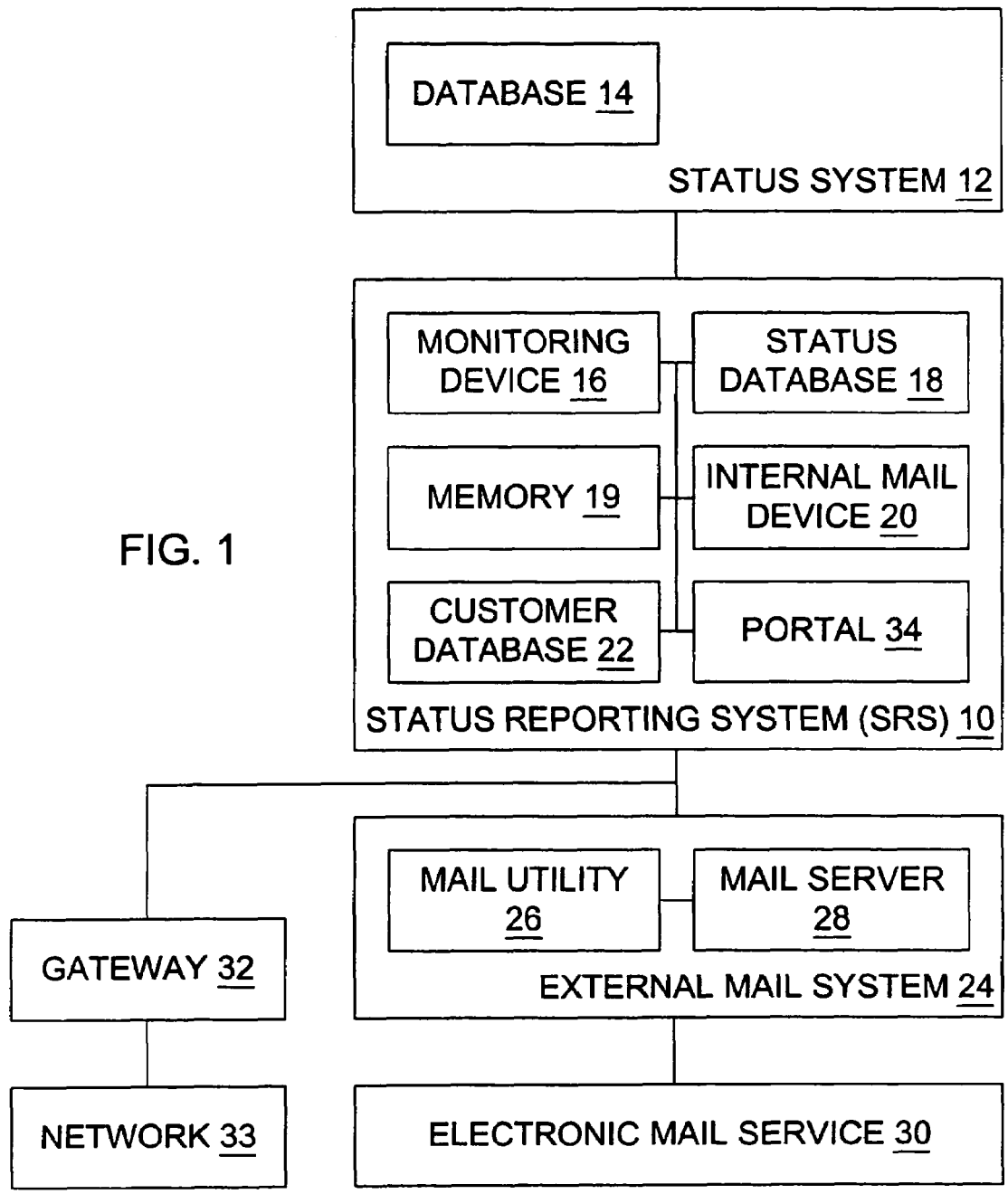
FIG. 1 is a block diagram showing an apparatus for providing automatic status notification in accordance with one embodiment of the present invention.

Referring now to FIG. 1, in the present invention, a status reporting system (SRS) 10 is coupled to a status system 12 in accordance with one embodiment of the present invention. As was pointed out above, the status system 12 allows a manufacturer, for example, to keep track of the status of each phase of the manufacturing of the product, the status of the manufacturing of each system component, etc. Of course, other types of entities may employ such status system 12 and such SRS 10 in combination therewith without departing from the spirit and scope of the present invention. Such other entities include but are not limited to product developers, software developers, building and trade contractors, administrators, and the like. The status system 12 may for example be the aforementioned Legacy 7 system, although other status systems 12 may be employed without departing from the spirit and scope of the present invention, and may run on any particular type of system and processor, again without departing from the spirit and scope of the present invention.

As was also pointed out above, the status system 12 includes a database 14 or the like that receives and stores a plurality of pre-determined goals and sub-goals (i.e., project milestones), as well as information regarding whether and when each project milestone is reached. For example, for a relatively complex piece of electronic equipment ordered by a customer A, the database 14 may include milestones including whether and when each assembly is completed, each sub-assembly is completed, each circuit board is completed, each assembly is tested, each sub-assembly is tested, each circuit board is tested, each assembly is installed, each sub-assembly is installed, each circuit board is installed, etc. Presumably, the status system 12 is promptly updated on an ongoing basis as the piece of equipment proceeds toward completion.

Notably, the status system 12 likely tracks status for a plurality of projects, each of which may have a different customer or ultimate destination ('customer'). Preferably, the status system 12 tags each piece of information therein with an ID for the project to which it applies and an ID for the customer. The ID may also or instead be for any other interested party.

In one embodiment of the present invention, the SRS 10 is coupled to the status system 12 by an appropriate connection, such as a network connection, a direct connection, a telephone connection, etc., although any other connection may be employed without departing from the spirit and scope of the present invention. As seen in FIG. 1, the SRS 10 includes a monitoring device 16 that periodically contacts the status system 12 by way of the aforementioned connection to determine if there is new status information to report out.

The monitoring device 16 may determine whether there is new status information to report out by referring to a status database 18 in or associated with the SRS 10. In one embodiment of the present invention, the status database 18 includes all previous status information with regard to each ongoing project. Thus, the monitoring device 10 may compare the status information for each project as stored in the status database 18 and the status information for each project as provided by the status system 12 and note any differences. As should be evident, such differences identify new status information that is to be reported out. Preferably, once reported out, the status information for each project stored in the status database 18 is updated with the new status information. Accordingly, the updated status information for each project as stored in the status database 18 and the status information for each project as provided by the status system 12 should coincide.

As may be appreciated, storing all status information for each project in the status database 18 may require an excessive amount of storage space. Accordingly, in another embodiment of the present invention, only the time of the last review by the monitoring device 16 is stored in the status database 18, each piece of status information stored in the status system 12 is tagged with a time stamp, and the monitoring device 16 looks in the status system 12 for only those pieces of status information stored therein that have a time stamp later than the time of the last review as stored in the status database 18. Preferably, once such pieces of status information have been reported out, the status database 18 is updated with the time of the present review. Thus, the next review by the monitoring device 16 of the status system 12 will locate only those pieces of status information stored therein subsequent to the present review.

In still another embodiment of the present invention, the status system 12 keeps track of those pieces of status information that have been reported, either by appropriately tagging such pieces of status information or otherwise. Thus, the monitoring device 16 need only request that the status system 12 provide those pieces of status information that have not as yet been reported. Preferably, once reported, such pieces of status information are marked as reported. As should be appreciated, in this embodiment, the status database 18 of the SRS 10 is not believed to be necessary since the status system 12 itself is keeping track of those pieces of status information that have been reported. However, this embodiment may require modifications to the status system 12 to allow such status system 12 to keep track of those pieces of status information that have been reported.

The monitoring device 16 of the SRS 10 may be configured to check the status system 12 for new status information on demand. Preferably, though, the monitoring device 16 is configured to automatically check the status system 12 on a periodic basis, for example once a day, once an hour, or once each minute. The frequency of course will vary depending on the amount of new status information expected, the timeliness with which the new status information is expected by customers, system resources, and the like.

Once the monitoring device 16 of the SRS 10 has determined that there is new status information to report out to customers, such SRS 10 obtains and stores such new status information in a memory 19 in an appropriate manner. Parenthetically, the status database 18 may be stored in the memory 19 or elsewhere. Of course, any method and/or device for actually obtaining and storing the new status information may be employed without departing from the spirit and scope of the present invention. Once obtained and stored, though, such new status information must be reported out to the customer.

As was discussed above, the status system 12 preferably tags each piece of information therein with an ID identifying the relevant customer. The SRS 10 is preferably provided with such ID for each piece of status information received from the status system 12, and therefore can identify the customer from such ID and forward the piece of information to such customer based on such ID. In one embodiment of the present invention, the SRS 10 forwards each piece of information to its associated customer by way of an electronic mail service 30. Any appropriate electronic mail service 30 may be employed without departing from the spirit and scope of the present invention. For example, the electronic mail service 30 may be an Internet E-Mail service, where the piece of information is formatted into an Internet E-Mail form and is addressed to the customer by way of an appropriate Internet E-Mail address. The mail service 30 may also be an Internet or telephone-based voice mail service, where the piece of information is formatted into a voice mail form and is sent to the customer by way of an appropriate Internet address or telephone number.

In one embodiment of the present invention, then, and as seen in FIG. 1, the SRS 10 includes an internal mail device 20 that receives each piece of information from the monitoring device 16, that ascertains from the received piece of information the customer ID, that locates a customer electronic mail address for the customer based on the customer ID, and that formats the piece of information into a piece of electronic mail which includes the piece of information and the located customer electronic mail address. Notably, the electronic mail device 20 may produce such piece of electronic mail in any form without departing from the spirit and scope of the present invention. For example, such piece of electronic mail may be text-based (i.e., e-mail or the like), sound-based (i.e., voice mail or the like), video-based, etc.

Preferably, and as seen in FIG. 1, to locate the customer electronic mail address for the customer, the SRS 10 includes a customer database 22 which includes such information for each customer ID used by the status system 12, and the internal mail device 20 is provided access to such customer database 22. Parenthetically, the customer database 22 may be stored in the memory 19 or elsewhere. Accordingly, if a piece of information is tagged with a particular customer ID, the internal mail device 20 can locate a corresponding electronic mail address for such particular customer ID by referring to the customer database 22. Of course, the type of electronic mail address may vary based on whether the electronic mail is text-based, sound-based, video-based, etc. Accordingly, any type of mail address may be employed without departing from the spirit and scope of the present invention.

In one embodiment of the present invention, the customer ID in the customer database 22 cross-references a plurality of pre-defined corresponding electronic mail addresses, perhaps including a variety of types of addresses (such as text-based, sound-based, video-based, etc.). Thus, the internal mail device 20 can appropriately format the piece of information into a piece of electronic mail and send the mail to the plurality of electronic mail addresses. Of course, if some addresses are text-based and some addresses are voice-based, for example, the internal mail device 20 must appropriately format the piece of information into a piece of text-based electronic mail and a piece of voice-based electronic mail, send the text-based mail to the text-based addresses, and send the voice-based mail to the voice-based addresses. As should be appreciated, then, status notification can be sent to multiple entities. For example, status notification for an ordered product may be sent to an entity that ordered the product, an entity that is responsible for product delivery, an entity that is responsible for financing the purchase of the product, an entity at a financial institution that will provide the funds to finance the product, and the like.

Once properly formatted, the internal mail device 20 then delivers the piece of electronic mail to an external mail system 24. The external mail system 24 may be any appropriate mail system without departing from the spirit and scope of the present invention. Of course, the external mail system 24 should be able to appropriately handle any type of mail received, be it text-based, voice-based, video-based, or otherwise. Alternatively, multiple external mail systems 24 may be employed, at least one for each type of mail received. As seen in FIG. 1, the external mail system 24 may include a mail utility 26 for configuring the piece of electronic mail for further processing, and a mail server 28 that receives the configured piece of electronic mail from the mail utility 26 and then forwards the piece of electronic mail to its ultimate destination by way of the aforementioned electronic mail service 30.

With the architecture of FIG. 1 thus far described, the method of operation of the present invention is as follows.

Figure 2:
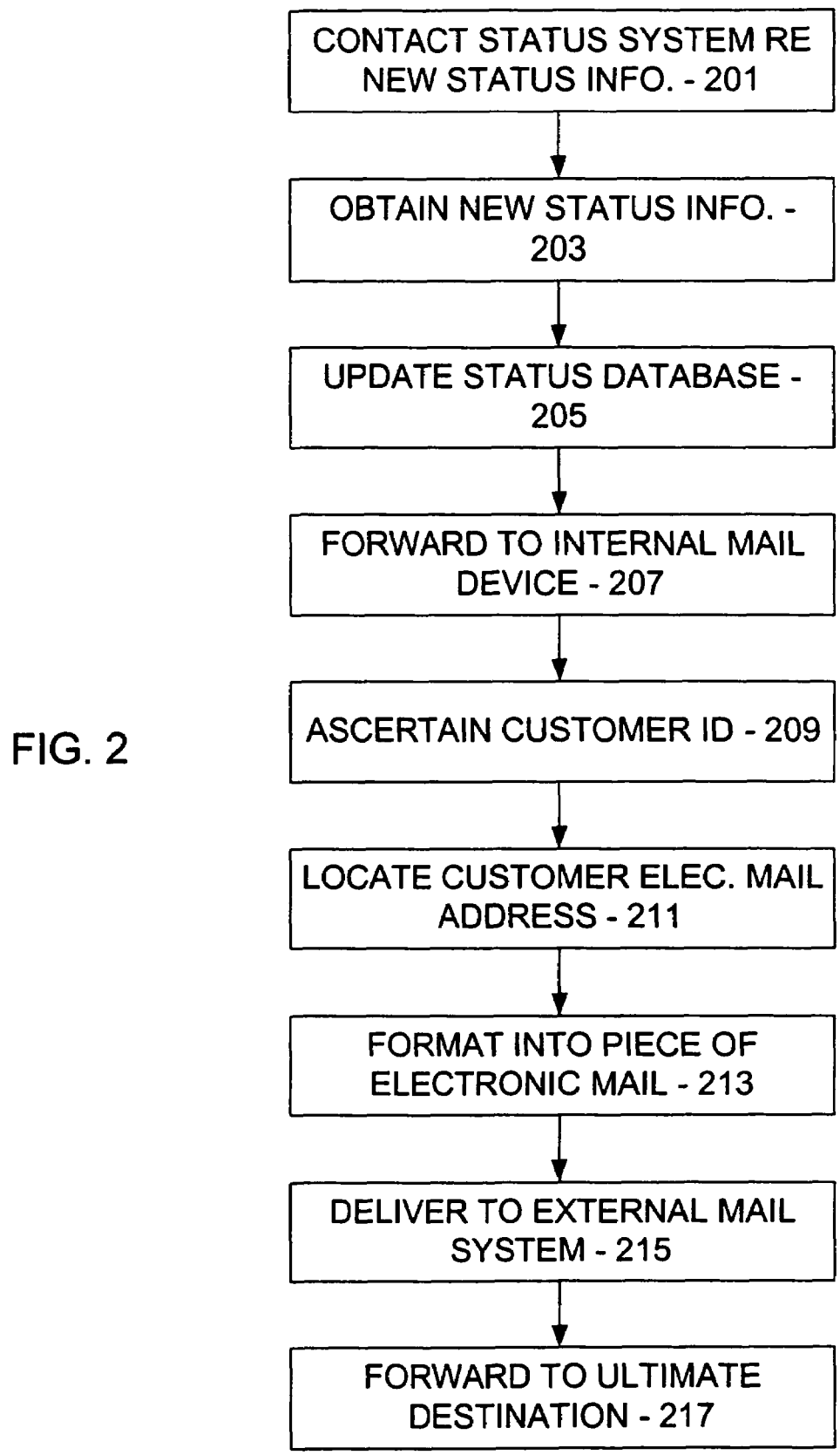
FIG. 2 is a flow chart showing steps performed by the apparatus of FIG. 1 in accordance with one embodiment of the present invention.

Referring now to FIG. 2, it is seen that the monitoring device 16 of the SRS 10 periodically contacts the status system 12 to determine if there is new status information to report out (step 201). As was discussed above, such determination may be made with reference to the status database 18 of the SRS 10 to identify new pieces of status information. Such new status information is obtained by the monitoring device 16 from the status system (step 203), and the status database 18 is appropriately updated (step 205). Each piece of obtained status information is then reported out to the respective customer.

Specifically, each piece of information is forwarded from the monitoring device 16 to the internal mail device 20 (step 207), and such internal mail device 20 ascertains from the forwarded piece of information the customer ID) (step 209), locates in the customer database 22 a customer electronic mail address for the customer based on the customer ID (step 211), and formats the piece of information into a piece of electronic mail which includes the piece of information and the located customer electronic mail address (step 213). Of course, if the customer database 22 includes multiple addresses, the piece of information is formatted into a piece of electronic mail which includes the piece of information and each of the multiple addresses so that the piece of information is sent to each of the multiple addresses.

The internal mail device 20 then delivers the formatted piece of electronic mail to the external mail system 24 (step 215). Once received, such external mail system 24 then forwards the piece of electronic mail to its ultimate destination by way of the electronic mail service 30 (step 217).

In one embodiment of the present invention, in addition to or instead of receiving electronic mail notifications of new status information, a customer may access the SRS 10 to collect new status information on demand. In such a situation, and referring again to FIG. 1, an appropriate gateway 32 is provided between an external network 33 (the Internet, the public switched telephone system, etc.) and the SRS 10, and the SRS 10 is provided with an appropriate portal 34 to allow for such customer access. Of course, the portal 34 would ensure that only appropriate parties can access the SRS 10, for example by way of an ID and password, and each party accessing the SRS 10 is provided only with data relevant to such party. Any appropriate gateway 32 and portal 34 may be employed without departing from the spirit and scope of the present invention. The protocols and apparatus employed by such gateway 32 and portal 34 are generally known and therefore need not be described herein in any detail.

In one embodiment of the present invention, the SRS 10 is constituted as a series of software modules running on a computer or server. However, some or all of the software modules may instead be hardware modules without departing from the spirit and scope of the present invention. The programming necessary to effectuate the present invention, such as the programming run by the SRS 10, the status system 12, and the external mail system 24, is known or is readily apparent to the relevant public. Accordingly, further details herein as to the specifics of such programming is not believed to be necessary.

As should now be understood, in the present invention, a method and system are provided to automatically notify a customer of updates in the status of the product under manufacture without providing the customer with direct access to the manufacturer's status system. Changes could be made to the embodiments described above without departing from the broad inventive concepts thereof. It is understood, therefore, that the present invention is not limited to the particular embodiments disclosed, but is intended to cover modifications within the spirit and scope of the present invention as defined by the appended claims.

The invention claimed is:

1. A status reporting system (SRS) for allowing an interested party to review project status information associated with at least one of assembly and testing of electronic equipment based on status information stored in a status system, the SRS being communicatively coupled to the status system and comprising:

a monitoring device contacting the status system to determine whether such status system has new project status information associated with at least one of assembly and testing of electronic equipment stored therein and obtaining such new status information from the status system;

an ID database, the status system tagging the status information stored therein with an ID identifying the interested party, the ID database including a record having the ID and a password for the interested party;

a status data base including status data, the monitoring device referring to the status data in the status database in conjunction with determining whether the status system has new status information stored therein, wherein each piece of status information stored in the status system is tagged with a time stamp, wherein the status data in the status database includes a time indicative of a last contact review of the status system by the monitoring device, and wherein the monitoring device obtains from the status system only those pieces of information stored therein that have a time stamp later than the time of the last review as stored in the status database, and wherein the status database is updated with a time indicative of the present review; and a portal providing access to, an interested party to said obtained status information.

2. The SRS of claim 1, wherein the status data in the status database includes previous status information obtained from the status system for the project, and wherein in the monitoring device compares the status information for the project as stored in the status database and the status information for the project as stored in the status system and notes differences that identify the new status information.

3. The SRS of claim 2, wherein the status database is updated with new status information.

4. The SRS of claim 1, wherein the monitoring device contacts the status system and obtains the new status information automatically on a periodic basis.

5. The SRS of claim 1 further comprising a memory storing the obtained new status information.

6. The SRS of claim 1, wherein the monitoring device contacts the status system and obtains the new status information and then said SRS determines which interested party is associated with said new status information.

7. A computer-readable medium having stored thereon computer-executable instructions implementing a method for allowing an interested party to review the status of a project information associated with at least one of assembly and testing of electronic equipment based on status information stored in a status system, the method comprising:

contacting the status system to determine whether such status system has new project status information associated with at least one of assembly and testing of electronic equipment stored therein, and obtaining such new status information from the status system;

ascertaining from the obtained status information the interested party; and providing access to said interested party to said obtained status information through a portal, and using an ID database, the status system tagging the status information stored therein with an ID identifying the interested party, the ID database including a record having he ID and a password for the interested party;

the method further comprising referring to status data in conjunction with determining whether the status system has new status information stored therein, wherein each piece of status information stored in the status system is tagged with a time stamp, and wherein the status data includes a time indicative of a last contact review of the status system, the method comprising obtaining from the status system only those pieces of status information stored therein that have a time stamp later than the time of the last review as stored in the status data, the method comprising updating the status data with a time indicative of the present review.

8. The medium of claim 7, wherein the status data includes previous status information obtained from the status system for the project, the method comprising comparing the previous status information for the project and the status information for the project as stored in the status system and noting differences that identify the new status information.

9. The medium of claim 8, wherein the method comprises updating the status data with the new status information.

10. The medium of claim 7, wherein the method comprises contacting the status system and obtaining the new status information therefrom automatically on a periodic basis.

11. The medium of claim 7, wherein the method further comprises storing the obtained new status information in a memory.

12. The medium of claim 7, wherein the method further comprises contacting the status system with said monitoring device and obtaining the new status information and then said SRS determines which interested party is associated with said new status information.

13. The SRS of claim 1, wherein said project is a physical device including components.

14. The SRS of claim 13, wherein milestones are created and tracked by said monitoring device for at least assembly and testing portions for said components.

15. The SRS of claim 13, wherein said monitoring device queries only for milestones of said project that have not previously been updated.

* * * * *